R. GROSS.
SAFETY DEVICE FOR THRESHING MACHINES.
APPLICATION FILED JUNE 14, 1911.
1,029,117.
Patented June 11, 1912.
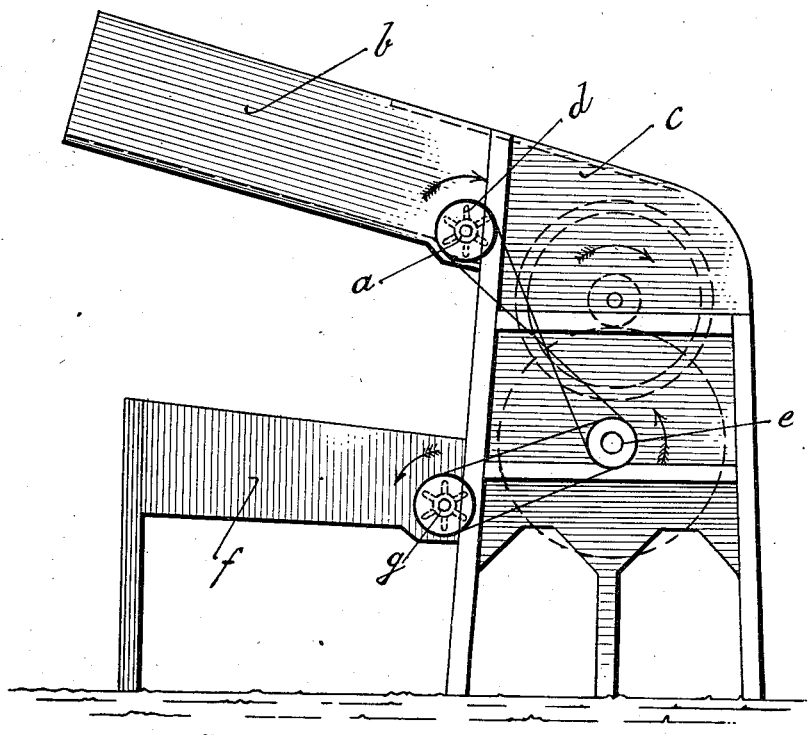

UNITED STATES PATENT OFFICE.

ROBERT GROSS, OF KL. DAMERAU, GERMANY.

SAFETY DEVICE FOR THRESHING-MACHINES.

1,029,117.   Specification of Letters Patent.   Patented June 11, 1912.

Application filed June 14, 1911. Serial No. 633,202.

*To all whom it may concern:*

Be it known that I, ROBERT GROSS, a subject of the King of Prussia, residing at Kl. Damerau, in the Kingdom of Prussia, Germany, have invented certain new and useful Improvements in Safety Devices for Threshing-Machines, of which the following is a specification.

This invention relates to a safety device for the machines which protects the attendants of the machine from injury when they are putting the sheaves into the feeding chute of the machine. The safety device serves at the same time for securely conducting the stalks of the corn to the threshing drums.

In the accompanying drawings the improved threshing machine is shown diagrammatically in side elevation.

The safety device consists of a cylinder $a$ which is revolubly mounted upon the bottom of the feeding chute $b$. This cylinder has radial pins $d$ with round heads which are adapted to grip the stalks of the corn and to conduct them toward the drums.

The cylinder $a$ revolves slowly and, owing to the rounded heads of its radial arms it does not offer any danger to the hands of the attendants. The cylinder $a$ being arranged in front of the threshing drum it prevents the hands of the attendants from coming in contact with the quickly revolving threshing drums. The cylinder $a$ is driven from the main shaft $e$ by means of a belt transmission. The transverse protecting cylinder $a$ is arranged at the beginning of the hood $c$ of the threshing drums.

If the threshing machine has a straw-shaker $f$, a protecting cylinder $g$ of the same construction as that shown at $a$ is arranged between the straw-shaker $f$ and the threshing drums.

I claim:—

A threshing machine comprising in combination the feed chute and the threshing drum, a protecting cylinder transversely mounted across the inner end of said feed chute, said chute being unobstructed in front of said cylinder, radial arms on said cylinder provided with rounded ends, and means for revolving said protecting cylinder directly from the shaft of the threshing drum and in the same direction as the threshing drum, substantially as described and shown and for the purpose set forth.

In witness whereof I have hereunto set my hand in the presence of two witnesses.

ROBERT GROSS.

Witnesses:
 M. HAUNKE,
 HERM. SCHTIMM.

Copies of this patent may be obtained for five cents each, by addressing the "Commissioner of Patents, Washington, D. C."